(12) United States Patent
Esquivel

(10) Patent No.: US 10,726,092 B2
(45) Date of Patent: Jul. 28, 2020

(54) METHOD OF IMPROVING WEB PAGE LOADING TIME USING SCANNABLE INDICIA

(71) Applicant: ShimmerCat AB, Umea (SE)

(72) Inventor: Alcides Viamontes Esquivel, Umea (SE)

(73) Assignee: Shimmercat AB, Umea (SE)

( * ) Notice: Subject to any disclaimer, the term of this patent is extended or adjusted under 35 U.S.C. 154(b) by 0 days.

(21) Appl. No.: 16/506,690

(22) Filed: Jul. 9, 2019

(65) Prior Publication Data
US 2020/0012695 A1    Jan. 9, 2020

Related U.S. Application Data

(60) Provisional application No. 62/695,516, filed on Jul. 9, 2018.

(51) Int. Cl.
| | |
|---|---|
| *G06F 16/957* | (2019.01) |
| *H04L 29/08* | (2006.01) |
| *G06F 16/955* | (2019.01) |
| *G06F 16/958* | (2019.01) |

(52) U.S. Cl.
CPC .......... *G06F 16/957* (2019.01); *G06F 16/958* (2019.01); *G06F 16/9558* (2019.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2002/0023141 A1* | 2/2002 | Yen | ..................... | H04L 67/2842 709/217 |
| 2008/0163076 A1* | 7/2008 | Reponen | ............. | G06F 16/9577 715/760 |
| 2009/0069000 A1* | 3/2009 | Kindberg | ............ | G06F 16/9577 455/414.3 |
| 2012/0194519 A1* | 8/2012 | Bissell | ................ | G06F 16/9577 345/428 |

* cited by examiner

*Primary Examiner* — Asher D Kells
(74) *Attorney, Agent, or Firm* — Smith & Hopen, P.A.; Paul Murty

(57) ABSTRACT

A method of identifying content, in particular images, that web page visitors view upon an initial connection to a web page. The method includes the server identifying the content most likely to be viewed by a user upon visiting a web page, and prioritizing that content such that the user can interact with the web page without buffering interruption. For example, the method connects each image in an HTML code to the ultimate location of the image on a user's browser, allowing the server to prioritize images to send to the user's electronic device based on the location of the image. As such, the method represents an improvement over existing loading protocols, including the HTTP/2 protocol, by utilizing image location information to identify and prioritize images, and thus determine what images to send to the user's electronic device.

11 Claims, 6 Drawing Sheets

METHOD OF IMPROVING WEB PAGE LOADING TIME USING SCANNABLE INDICIA

CROSS-REFERENCE TO RELATED APPLICATIONS

This nonprovisional application is a continuation of and claims priority to provisional application No. 62/695,516, entitled "Method of improving web page loading time," filed Jul. 9, 2018 by the same inventor.

BACKGROUND OF THE INVENTION

1. Field of the Invention

This invention relates, generally, to methods of improving web page loading times. More specifically, it relates to a method of creating a hierarchy of web page content to be loaded on a user's electronic device, thereby decreasing the loading time of a web page, in particular a web page including images.

2. Brief Description of the Prior Art

Since the advent of the internet, developers have faced a problem of ensuring that web page content loads correctly and efficiently on a user's electronic device. In the current landscape of the internet, content-loading times can be the difference between retaining a web page visitor, or the visitor leaving the site to explore similar web pages. As more consumers turn to web-based retail platforms as opposed to traditional brick-and-mortar stores, web page loading time can influence consumer decisions on where to purchase goods and services. Studies have shown that website visitors scan a web page in a particular order, and it is important to optimize the rendering and loading of content in the portion of the screen viewable to the user to improve visitor engagement. [1] [2] [3] [4].

In 2015, developers began using a new protocol for the first time in almost two decades, switching from the HTTP 1.1 protocol to the newly-created HTTP/2. While part of the reason for the shift to a new protocol was to increase web page security, some of the major advantages of HTTP/2 related to decreases in latency to improve web page loading time. For example, the HTTP/2 protocol introduced a "server push" functionality, which allows for the transmission of web page resources from a server to a user's electronic device before the device requests the resources. As such, a user can utilize a browser to access a web page, and a server will transmit multiple resources to the browser in response, without receiving individual requests for each resource, thereby improving web page loading time. In addition, the HTTP/2 protocol allows for the prioritizing of resources, such that the most necessary data is transmitted to the user's electronic device before lower-level resources. [5]

While the HTTP/2 protocol has decreased web page latency and has improved loading times through the above features, there is currently no reliable or consistent way of knowing what content an individual user needs upon visiting a web page. Typically, web pages utilizing HTTP/2 prioritize basic resources, such as style and font files; however, if some of these features appear beyond the initial visible loading screen of a web page, the web page may still suffer from loading time problems with the content that appears first. In particular, images are typically not prioritized by web pages due to the size of the images; however, such images are often beneficial for retaining the attention of users who access the web page.

The HTTP/2 protocol includes procedures to specify resource priorities, and browsers may prioritize images by loading the HTML of a web-page, running any content scripts, and leveraging the result of best-effort inferences to indicate priorities via the HTTP/2 protocol. This process, however, has a few shortcomings. First, by the moment the browser has enough information to indicate correct resource priorities, the visitor may have been already waiting for some time for the page to load, and some resources may have been transferred in part or in full using inaccurate priorities. Second, browsers do not uniformly implement these best-effort inferences; moreover, these best-effort inferences can be easily disrupted by content scripts running at varied times during the loading of a web page. [6].

Accordingly, what is needed is a method of identifying the content that web page users are most likely to see upon initially loading a web page on particular devices, operating systems, and settings, as well as a method of using the identified information to prioritize the content transmitted to users to reduce web page loading time. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a method of identifying and prioritizing content, such as images or other multimedia, to transmit to user electronic devices, thereby improving web page loading times, is now met by a new, useful, and nonobvious invention.

The novel method of improving web page loading speed includes a step of providing a web page in communication with a web server, the web page including at least written content and image content, and including a visible area and a hidden area. The web server receives from a browser a request to access content on the web page that is in communication with the web server. The method includes scanning the web page for content, such that the particular content is prioritized for a user accessing the web page, based on the user's electronic device, browser, operating system, and settings, such as the particular electronic device, the screen size, the screen resolution, and other settings. The method also includes associating, via the web server, scannable indicia with the image content. The web server may replace the image content of the web page with the scannable indicia by associating a resource path of each of the image content with the scannable indicia. A device server receives a request to launch a testing browser to view the web page, the testing browser being equivalent to a browser on a personal electronic device, such that testing can be performed on the testing browser to determine a priority for image content loading. As such, the device server receives a screen configuration of the personal electronic device for the testing. The web server transmits to the testing browser the written content and the scannable indicia of the web page. A cloud-based executable program in communication with the testing browser analyzes the visible area of the web page to locate one or more of the scannable indicia. The cloud-based executable program may insert a cookie associated with instructions to associate the scannable indicia with the image content when the request from the browser on one or more personal electronic devices to view the web page is received on the web server. The method includes a step of transmitting, from the web server to the browser of the personal electronic device, the image content associated with the scannable indicia within the visible area, thereby prioritizing the image content displayed within the visible area of the browser of the personal electronic device. A plurality of personal electronic devices and screen configurations can be tested via the method.

In an embodiment of the method, a set of servers and programs include a web server, a device server, and a cloud-based executable program. These three components receive input URLs from a target web domain and client device configurations, and produce output priorities for the sub-resources of the web pages in the input URLs. The steps to produce this output start by identifying a set of browser configuration in user devices and a set of page URLs for the target domain. For each combination of user device configuration and page URL, an instance of a browser that is equivalent to the browser in the user device configuration is started in a device server at the behest of the cloud-based executable program. From there, the equivalent browser is instructed to load the web page represented by the input URL, in a way that mimics the behavior of a browser in an actual user device, with one fundamental difference: the browser request includes an added cookie or mark which is special to the web server. The web server, upon receiving the request containing the special cookie or mark, behaves as it would with a browser in an actual user device, except for the fact that it replaces images in the web page with scannable indicia. After the web page including scannable indicia finalizes loading in the equivalent browser, the cloud-based executable program instructs the equivalent browser to make a digital copy of its active viewport and to render a report of all resources requested. When the cloud-based executable program receives this digital copy and the report, it scans the digital copy of the viewport to determine presence and position of the scannable indicia, which then are matched to resources requested by the equivalent browser. Thereafter, the cloud-based executable program uses the position of the scannable indicia and their direct correspondence with requested resources in the page to construct a set of priorities for the resources in the page. The resulting priority information is subsequently used by the web server to prioritize sub-resource delivery in subsequent visits to URLs matching the input URLs from actual user devices, resulting in faster web page loading.

An object of the invention is to improve web page loading times, and thereby improve web page functionality, by identifying and prioritizing web page content, particular the location and size of images on a web page, to push targeted content to user electronic devices.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2 shows the HTML code that corresponds with different images appearing on the web page.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a method of identifying content, in particular images, that web page visitors view upon an initial connection to a web page. When a user accesses a web page, the user's browser presents the underlying HTML document and its directly or indirectly connected resources (such as style and font files, as well as images). The resources may be listed in the HTML code and subsequently appear on the browser; however, there is no straightforward correlation between the resource references in the HTML code and the ultimate appearance location on the browser's viewport. Rather, web page creators often resort to creative ways to arrange content on the web page. Accordingly, the present invention provides a method to connect each image URL in the HTML code to a specific location on the web page visitor's browser screen. The method accomplishes the connection by replacing the content, particularly the images, on a web page with scannable other otherwise readable codes that are used to determine image locations within a web page. As such, each image is connected to a specific location on the web page, and this information is stored in electronic media together with associated sets of attributes that are used to identify subsequent events that would result in fetching the same web page. Subsequently, when a web page is displayed on a browser, the stored image location data that is used to determine which images to prioritize while the web page loads. Accordingly, the web server transmits prioritized content depending on the desired location viewable by a user through the user's electronic device, representing an improvement over the typical functionality of web standards and the HTTP/2 protocol. Instead of sending images to the user's electronic device with the priority prescribed by the browser, the web server instead prioritizes content taking into account the previously-learned content visible on the web page, thereby ensuring that content displays on the user's electronic device when the user views a particular portion of a web page, and thereby improving web page loading times.

Figure 1A:
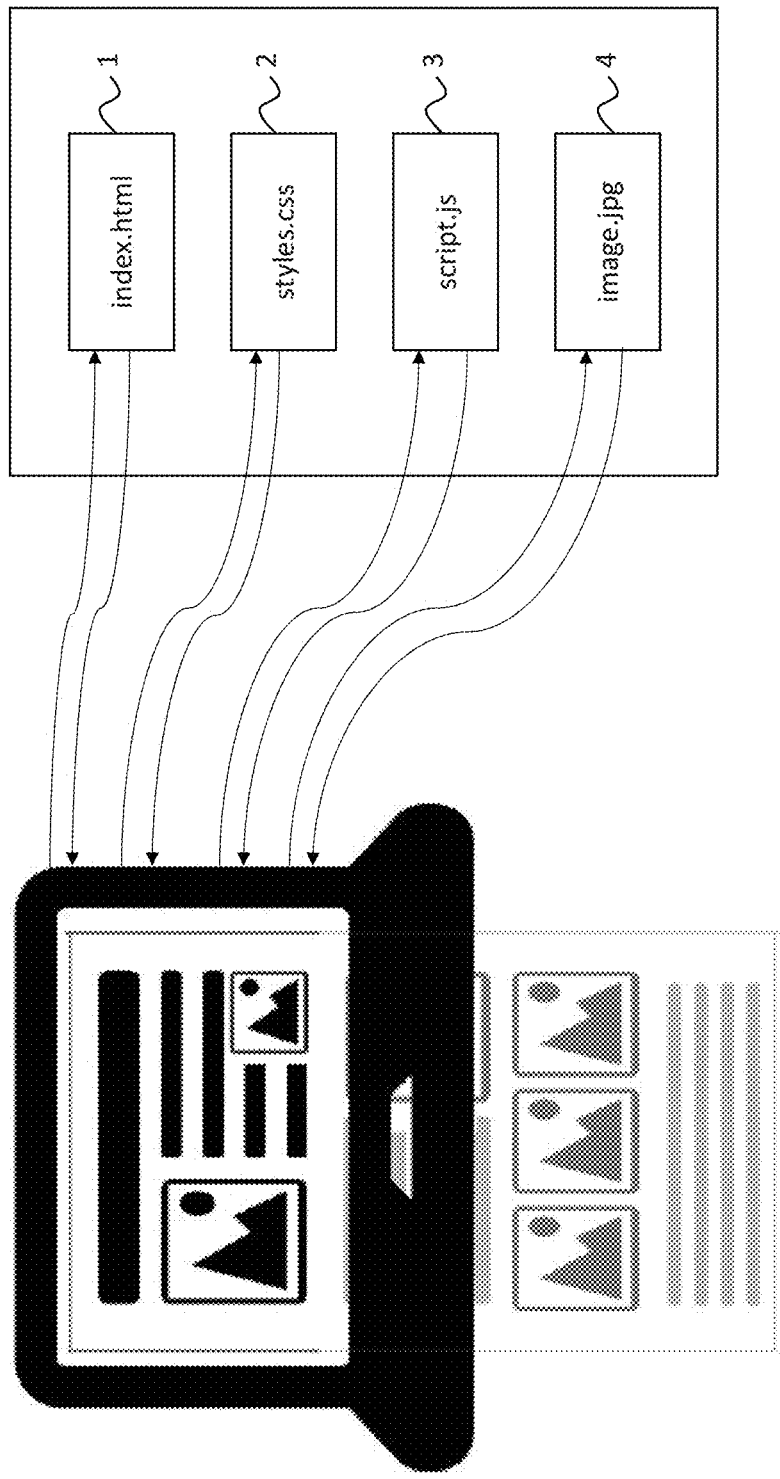
FIG. 1A depicts a prior art method of transferring files to a browser upon receiving a request from the browser.
Figure 1B:
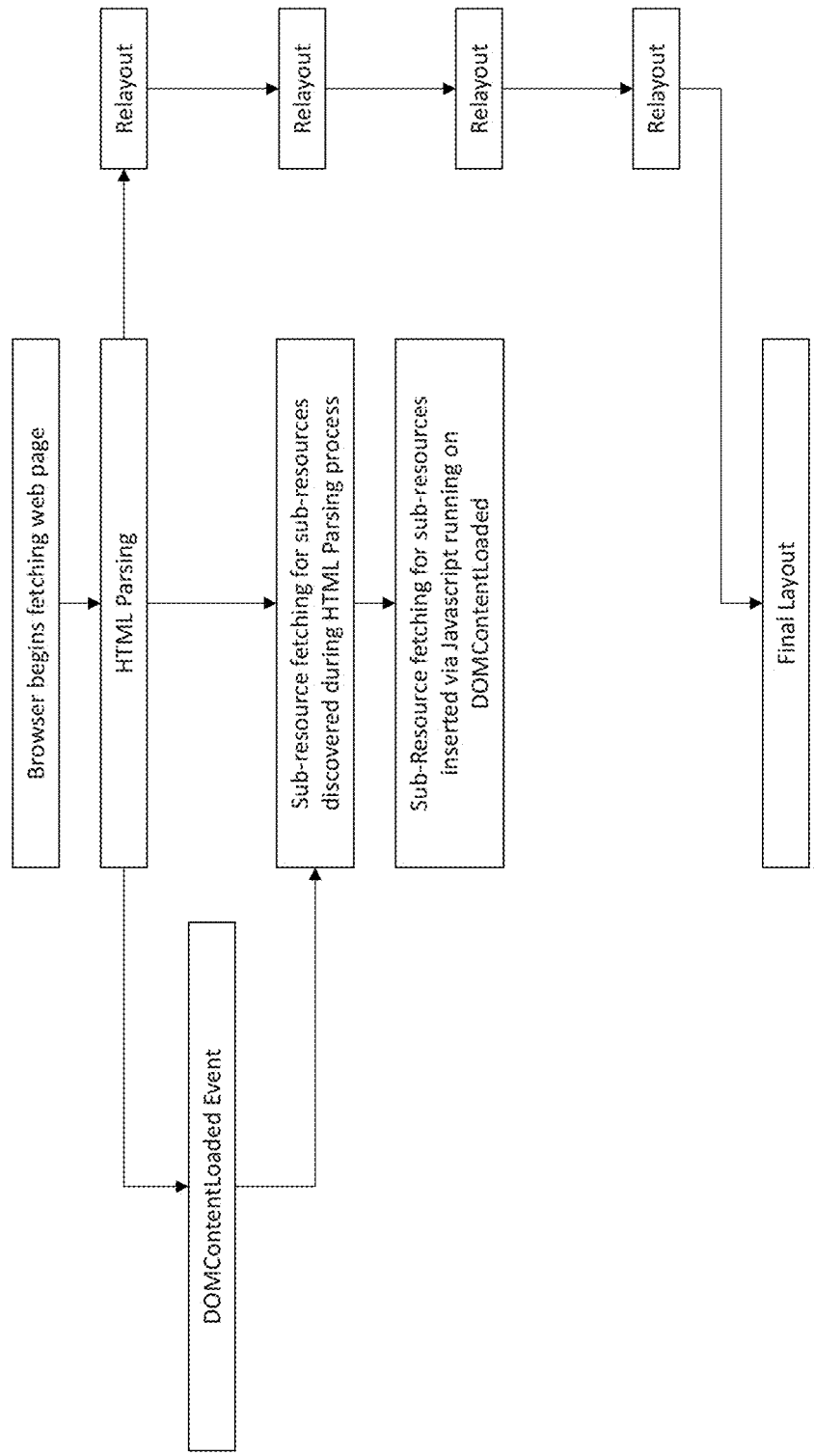
FIG. 1B depicts a process flow diagram of the prior art method of transferring files to a browser upon receiving a request from the browser of FIG. 1A.

Turning now to FIGS. 1A-1B, an exemplary web page includes an index.html file that is the main web page resource file, as well as a styles.css file, a script.js file, and an image.jpg file. FIGS. 1A-1B represent a prior art method of loading a web page, with the approximate chronological order of sub-processes that load. Some of these sub-processes discover resources needed to render the web page (for example, "HTML Parsing," or "DOMContentLoadedEvent" protocols), either through the declarative syntax of HTML and CSS (cascading style sheets), or through requests issued by Javascript (also called "content scripts") in the web page. [7] "Relayout" sub-processes happen in the browser concurrently with resource discovery and retrieval. After each of the sub-processes load, the browser needs to update both the list of resources to fetch and the priority of each resource. FIGS. 1A-1B also depicts the general goal of the present invention: after the page rendering process has finalized, layout information is analyzed via a novel process and stored electronically to prioritize resource retrieval in subsequent retrievals of the same web page.

Accordingly, as shown in FIGS. 1A-1B, when a user connects to a landing page of the web page through a browser installed on the user's electronic device, a web server receives the browser's request for content. During step 1 shown in FIG. 1A, the web server then transmits the main web page resource file, the index.html file, to the user's electronic device via the browser. However, in order for the user to view all of the content on the web page, the web server must also transmit the styles.css, script.js, and image.jpg files to the user's electronic device; in addition, the web server will only transmit these files upon receipt of a request from the user's browser. If there is no prioritization between the files, the browser requests the files as it discovers the files listed in the HTML file, index.html; in other words, the web server will receive browser requests for specific files when the browser reads through the HTML file and encounters the other files listed in the HTML file. The request and transmittal of the styles.css file occurs during step 2; the request and transmittal of the script.js file occurs during step 3; and the request and transmittal of the image.jpg file occurs during step 4.

When loading the web page, the server does not discriminate between the visible portion of the web page and the portions that are not visible—as such, when the web server transmits the images.jpg file to the user's electronic device, all of the images are transmitted to the user's browser. Web server and user bandwidths are used to transmit and receive files that the user may not need at a particular moment.

Figure 2:
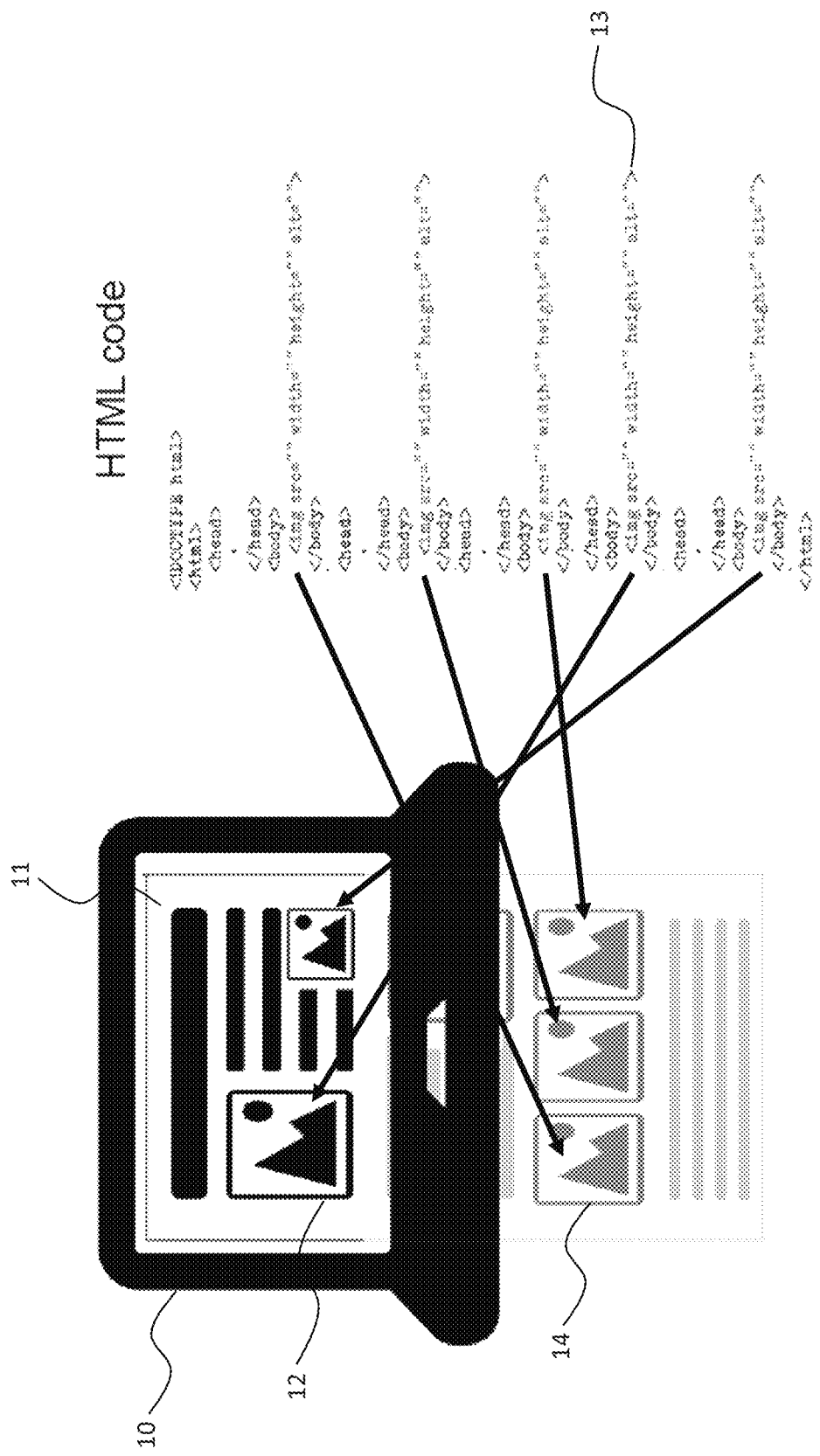
FIG. 2 depicts a web page and its corresponding HTML code, showing a visible portion of the web page on an electronic screen, as well as a portion of the web page that appears below the visible portion.

As shown in FIG. 2, the HTML code associated with different content on a web page may not be in a sequential order based on the viewable portion of the web page. For example, on the user side, or the front-end, a user utilizes personal electronic device 10 to access launch page 11 of a website, which is the initial portion of the website that the user sees upon loading the site-typically, launch page 11 includes content toward the top of the initial web page when viewed in a particular browser. Content 12, depicted as an image file, is viewable on launch page 11. As FIG. 2 shows, the HTML code for certain content may be listed above content that actually appears first on the web page. For example, HTML code 13 corresponding to content 12 is listed below the HTML code for hidden content 14. Under prior art protocols, the web server transmits requested content in the order in which the content appears in the HTML code, and some images that do not appear on the launch page will load prior to images on the launch page. In the example depicted in FIG. 2, hidden content 14 loads before content 12, meaning that a viewer would experience a delay in the loading of content 12 while launch page 11 loads.

Figure 3:
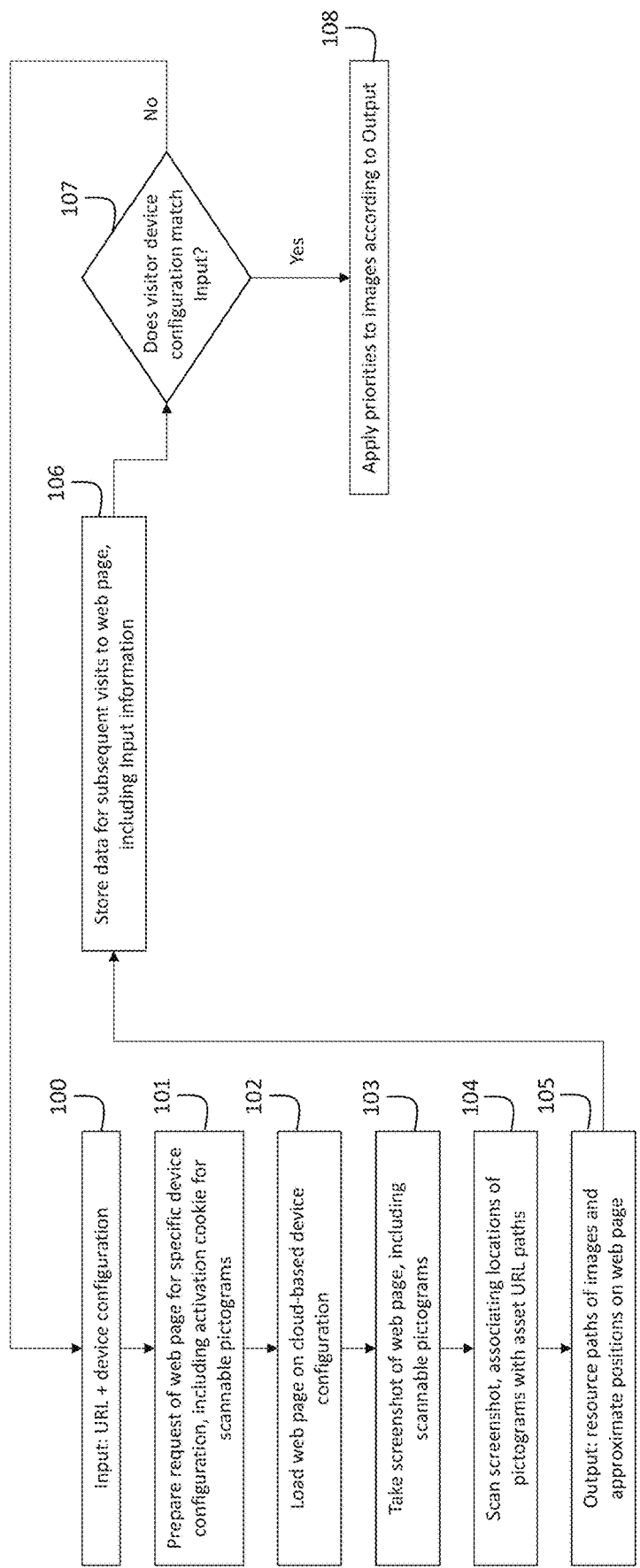
FIG. 3 is a process-flow diagram depicting a method of scanning a web page to associate content locations with associated HTML code.

As such, instead of prioritizing a certain package of a type of content (i.e., the styles.css, script.js, or image.jpg files as discussed above), the present method includes an identification and prioritization of the content viewable by a user upon loading a web page. FIG. 3 is a process-flow diagram of a method of improving web page loading speed. The steps delineated in the exemplary process-flow diagram of FIG. 3 are merely exemplary of an order or improving web page loading speed. The steps may be carried out in another order, with or without additional steps included therein.

As shown in FIG. 3, the top-level algorithm of an embodiment of the present invention includes a scanning process, a preparation process, and a rendering process. The scanning process begins at step 100, during which a target URL and a plurality of user device configurations are identified, the user device configurations including screen size and resolution configurations. During the scanning process that begins at step 100, the cloud based executable program selects various electronic devices, screen sizes, and screen resolutions. Step 100 serves as an initial step to the prioritization process of improving web page loading speed. For example, the URL points to a specific page within a web domain to be prioritized. In addition, because different browsers and operating systems include different specifications, resolutions, and window sizes, collecting data for a plurality of devices and configurations will aid in the identification of the user's device configuration later in the method, thereby providing for targeted prioritization based on the likely launch page on the identified URL. For example, the device configuration includes information such as browser type and iteration, operating system type and iteration, screen resolution and size, and window size for the browser. Accordingly, during the initial input step 100, the cloud program prepares an HTTP request that is similar to one that a browser of a particular user device configuration would use to render the web page, as well as a cookie that triggers a web server behavior particular to the invention upon the receipt of a request to render the web page.

During step 101 of the method, the cloud-based executable program prepares for displaying a page associated with the URL identified in the input step 100. The cloud-based executable program includes a group of settings associated with one of the plurality of user device configurations from step 100. For example, if the target device configuration is a desktop computer, the cloud-based executable program opens a browser with settings matching the desktop computer; similarly, if the target device configuration is a specific mobile device, the cloud-based executable program opens a browser with settings matching the specific mobile device. During step 101, the cloud-based program inserts a cookie or marking in the request that activates the replacement function of the web server. The cookie, or marking, is designed to be read by the web server, enabling the web server to replace content images by the unique identifiers or the scannable indicia, which can later be used to inform the content-prioritization process. The method proceeds to step 102, including a device server receiving a request to display launch page 11 on the cloud-based browser having a particular set of device display configurations. This cloud-based browser functions as an HTTP client and requests the input page to the web server using the request with the cookie or marking. Upon receiving said cookie, the web server replaces image content of the web page with scannable indicia, such as a pictogram or other coding, that optically identifies the resource path of the substituted image resource. The replacement process is discussed in greater detail above. During step 102, the website associated with launch page 11 begins to load on the cloud-based browser.

During step 103, the cloud-based executable program takes a screenshot of the web page to determine the location of particular content 12, such as the images on the web page. As discussed above, the web server replaces the images with pictographic representations of the images, such as codes or other scannable indicia, which serve as digital identifiers for content 12 location. As a result, the URL path for each individual image on the web page is identified with a code, which is scannable to determine image locations. One method of performing step 103 includes representing launch page 11, or the otherwise visible portion of the web page, as a viewport, which is a polygonal area that is viewed by an end user. The viewport is used by the cloud-based program to show a portion of the graphical representation of the web page, without showing the entirety of the web page, and is used to target the portion of the web page to ultimately be rendered on personal electronic device 10.

Figure 4:
FIG. 4 depicts the web page of FIG. 2 after the images are converted to scannable codes, making the web page scannable to connect the image location with the corresponding HTML code.
Figure 5B:
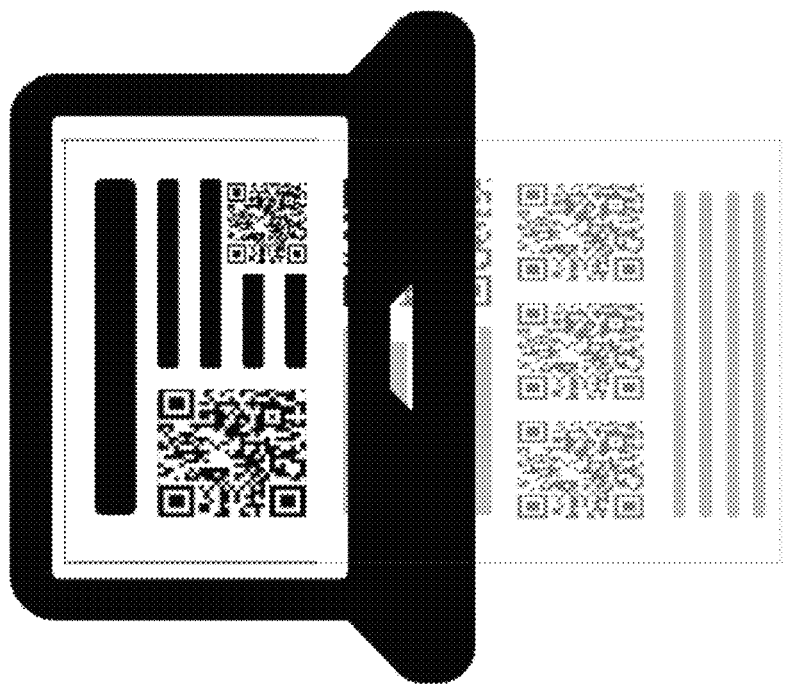
FIG. 5B depicts the scannable web page of FIG. 4, relating the locations of the target images of FIG. 2 with the scannable codes of FIG. 4.
Figure 5A:
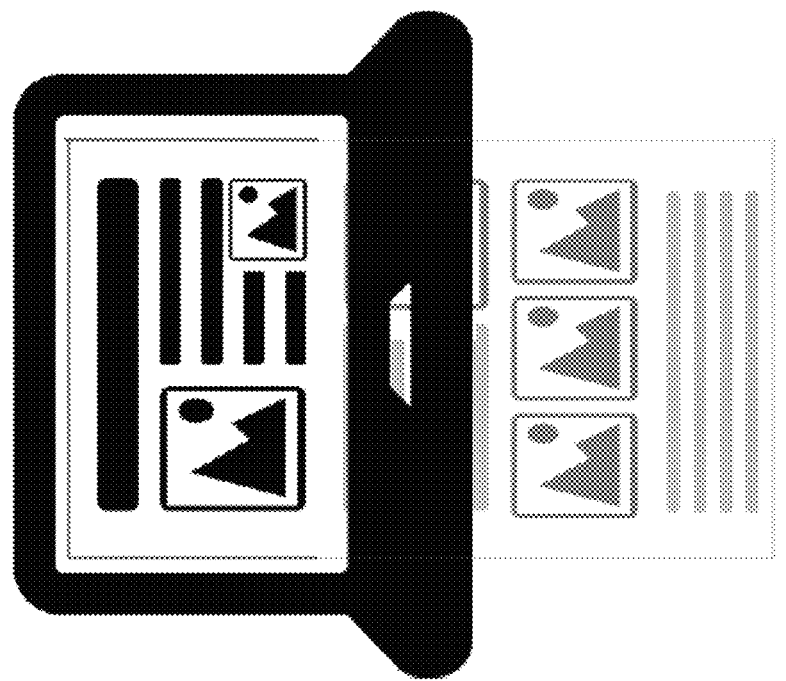
FIG. 5A depicts the viewable web page of FIG. 2, in accordance with an embodiment of the invention.

During step 104, the cloud-based executable program scans the screenshot taken during step 103 to associate the codes with the specific locations of the codes on the web page, and to associate the images with the codes. As such, the cloud-based program identifies which images should be displayed at a given time, thereby assigning a priority to the images. For example, in a typical application, the browser displays launch page 11 of the website, and the server identifies the images that should display on launch page 11. The linkage between one scannable code and its associated HTML counterpart is depicted in FIG. 4. During step 105, the cloud-based executable program outputs the correct images in the locations identified during steps 103 and 104, such that the browser displays images within the visible portion of the web page. Step 105 is depicted in greater detail in FIGS. 5A and 5B, with FIG. 5A depicting images that will ultimately be displayed on electronic device 10, and FIG. 5B depicting the corresponding codes for the images displayed on electronic device 10. During step 106, the input information and the output information are stored on the server for subsequent visits to the web page by devices having a certain configuration. It is appreciated that steps 100-106 can be repeated for each of a plurality of devices and configurations, such that input and output information for multiple unique devices and configurations can be stored on the cloud service and ultimately on the web server for requests received from different devices.

During step 107, a matching decision is made by the system, in which the web server receives a request to load a URL from personal electronic device 10. During step 107, the web server inquires and verifies if the requesting device has a configuration that matches the input device configuration from step 100. If the configuration matches, the method proceeds to step 108, during which the web server applies image loading priorities according to the output from step 105. However, if the configuration does not match, the method restarts at step 100 to determine the proper device configuration to ensure that the requesting device matches the device configuration stored on the server. To prevent lengthy loading times, the web server may apply image loading priorities according to a default setting while the other actors (for example, the cloud-based executable program, the device server, and the other back-end components) simultaneously or subsequently repeat steps 100-106 for the particular device configuration of personal electronic device 10.

Glossary of Claim Terms

Content: is a script, font, image or other multimedia file viewable on an electronic device.

Electronic device: is a cellular phone, tablet, computer, or other electronic device with networking capabilities, that can receive information from a server and display content transmitted by the server.

REFERENCES

[1] Sutcliffe A., Namoune A. (2007) Investigating User Attention and Interest in Websites. In: Baranauskas C., Palanque P., Abascal J., Barbosa S. D. J. (eds) Human-Computer Interaction—INTERACT 2007. Lecture Notes in Computer Science, vol 4662.

[2] Tzanidou E., Petre M., Minocha S., Grayson A. (2005) Combining Eye Tracking and Conventional Techniques for Indications of User-Adaptability. In: Costabile M. F., Paternò F. (eds) Human-Computer Interaction—INTERACT 2005. INTERACT 2005. Lecture Notes in Computer Science, vol 3585. Springer, Berlin, Heidelberg.

[3] Wagner, J. (2019). Why Performance Matters|Web Fundamentals|Google Developers. Retrieved Jun. 10, 2019, from https://developers.google.com/web/fundamentals/performance/why-performance-matters/.

[4] Green, V. (2016). Impact of slow page load time on website performance. Retrieved Jun. 12, 2019, from https://medium.com/@vikigreenfimpact-of-slow-page-load-time-on-website-performance-40d5c9ce568a.

[5] Belshe, M., BitGo, Peon, R., Inc, G., & M., T. (2015). *Hypertext Transfer Protocol Version 2 (HTTP2)*.

[6] Gomes, S. (n.d.). Resource Prioritization—Getting the Browser to Help You|Web Fundamentals|Google Developers. Retrieved Jun. 10, 2019, from https://developers.google.com/web/fundamentals/performance/resource-prioritization.

[7] CSS, M. (n.d.). *CSS. Cascading Style Sheets|MDN*. Retrieved Jul. 9, 2019, from https://developer.mozilla.org/en-US/docs/Web/CSS.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. A method of improving web page loading speed, the method comprising the steps of:
    providing a web page in communication with a web server, the web page including at least written content and image content, and including a visible area and a hidden area;
    associating, via the web server, scannable indicia with the image content;
    receiving, on a device server, a request to launch a testing browser to view the web page, the testing browser being equivalent to a browser on a personal electronic device;
    receiving, on the device server, a screen configuration of the personal electronic device;
    transmitting, from the web server to the testing browser, the written content and the scannable indicia of the web page;
    analyzing, via a cloud-based executable program in communication with the testing browser, the visible area of the web page to locate one or more of the scannable indicia; and
    transmitting, from the web server to the browser of the personal electronic device, the image content associated with the scannable indicia within the visible area, thereby prioritizing the image content displayed within the visible area of the browser of the personal electronic device.

2. The method of claim 1, wherein the screen configuration includes a characteristic selected from the group consisting of a screen size and a screen resolution.

3. The method of claim 1, further comprising a step of replacing, via the web server, the image content of the web page with the scannable indicia by associating a resource path of each of the image content with the scannable indicia.

4. The method of claim 1, further comprising a step of testing, via the web server, the device server, and the cloud-based executable program in communication with the web server and the device server, a plurality of personal electronic devices and a plurality of screen configurations to determine the image content displayed within the visible area of the browser of each of the plurality of personal electronic devices.

5. The method of claim 4, further comprising a step of inserting, via the cloud-based executable program, a cookie associated with instructions to associate the scannable indicia with the image content when the request from the browser on each of the plurality of personal electronic devices to view the web page is received on the web server.

6. A method of improving web page loading speed, the method comprising the steps of:
    storing a set of screen configurations for a plurality of different electronic devices in a database associated with a web server;
    providing a web page in communication with the web server, the web page including at least written content and image content, and including a visible area and a hidden area;
    associating scannable indicia with the image content;
    receiving, on a device server, the screen configuration of a requesting electronic device, and selecting, from the web server, one of the stored screen configurations from the database that matches the screen configuration of the requesting electronic device;
    transmitting, from the web server to the browser of the requesting electronic device, the written content and the scannable indicia of the web page;
    analyzing, via a cloud-based executable program in communication with the device server, the visible area of the web page for one or more of the scannable indicia, the visible area defined by the selected one of the stored screen configurations from the database; and
    transmitting, from the web server to the browser of the requesting electronic device, the image content associated with the scannable indicia within the visible area defined by the selected one of the stored screen configurations from the database, thereby prioritizing the image content displayed within the visible area of the browser of the requesting electronic device.

7. The method of claim 6, wherein the screen configuration of the requesting electronic device includes a characteristic selected from the group consisting of a screen size and a screen resolution.

8. The method of claim 6, further comprising a step of replacing, via the web server, the image content of the web page with the scannable indicia by associating a resource path of each of the image content with the scannable indicia.

9. The method of claim 6, further comprising a step of testing, via the device server and a cloud-based executable program in communication with the device server, a plurality of personal electronic devices and a plurality of screen configurations to determine the image content displayed within the visible area of the browser of each of the plurality of personal electronic devices.

10. The method of claim 9, further comprising a step of inserting, via the cloud-based executable program, a cookie associated with instructions to associate the scannable indicia with the image content when the request from the browser on each of the plurality of personal electronic devices to view the web page is received on the web server.

11. A method of prioritizing content on a given URL requested by an electronic device having a given configuration, the method comprising the steps of:
    receiving, on a cloud-based set of servers, an input target URL and an input target device configuration;
    launching, on the cloud-based set of servers, a cloud-based executable program;
    inserting, via the cloud-based executable program, a cookie associated with the input target URL;
    receiving, on a device server, a request from a cloud-based browser in communication with the cloud-based executable program to display a launch page associated with the input target URL, the request including the cookie associated with the input target URL;
    replacing, via the cloud-based set of servers, one or more images on the launch page with one or more scannable indicium, the one or more scannable indicium associated with a resource path of the one or more images;
    loading, on the cloud-based browser, the launch page including the one or more scannable indicium;

scanning, on the cloud-based executable program, a viewable portion of the launch page to identify a location of the one or more scannable indicium; and based on a determination that one or more of the scannable indicium is within the viewable portion of the launch page, creating a set of priority values for the one or more images, thereby prioritizing a loading order of the one or more images on the launch page.

* * * * *